United States Patent
Roberts et al.

(10) Patent No.: US 7,376,358 B2
(45) Date of Patent: May 20, 2008

(54) LOCATION SPECIFIC OPTICAL MONITORING

(75) Inventors: Kim Roberts, Nepean (CA); Maurice O'Sullivan, Ottawa (CA)

(73) Assignee: Nortel Networks Limited, St. Laurent, QC (CA)

( * ) Notice: Subject to any disclaimer, the term of this patent is extended or adjusted under 35 U.S.C. 154(b) by 823 days.

(21) Appl. No.: 10/677,269

(22) Filed: Oct. 3, 2003

(65) Prior Publication Data

US 2005/0008364 A1 Jan. 13, 2005

(30) Foreign Application Priority Data

Jul. 11, 2003 (CA) .................................. 0301044

(51) Int. Cl.
*H04B 10/04* (2006.01)

(52) U.S. Cl. ...................... 398/193; 398/182; 398/183; 398/184; 398/185; 398/186; 398/187; 398/188; 398/189; 398/192; 398/194; 398/200; 398/202; 398/33; 398/38; 398/30; 398/177; 398/147; 398/148; 398/158; 398/159; 398/141; 330/149; 327/317; 327/318; 327/306; 375/296; 359/245; 359/237; 359/246; 359/248; 359/276; 359/278

(58) Field of Classification Search ................ 398/182, 398/183, 186, 187, 188, 192, 177, 193, 29, 398/194, 30, 195, 33, 199, 38, 200, 202, 398/208, 140, 141, 147, 158, 159, 184, 185, 398/189, 148; 330/149; 327/317, 318, 306; 375/296; 359/245, 237, 246, 248, 276, 278

See application file for complete search history.

(56) References Cited

U.S. PATENT DOCUMENTS 5,148,503 A 9/1992 Skeie
5,311,346 A 5/1994 Haas et al.

(Continued)

FOREIGN PATENT DOCUMENTS

EP 0 524 758 1/1993

(Continued)

OTHER PUBLICATIONS

Sadhwani, Ram et al "Adaptive CMOS Predistortion Linearizer for Fiber-Optic Links", Journal of Lightwave Technology, Dec. 2003, pp. 3180-3193, vol. 21, No. 12., U.S.A.

(Continued)

*Primary Examiner*—Hanh Phan
(74) *Attorney, Agent, or Firm*—Kent Daniels; Ogilvy Renault LLP

(57) ABSTRACT

An optical spike is generated at an arbitrarily selected location within an arbitrary optical link. The optical spike is generated by deriving a spike signal having a plurality of components, and launching the spike signal into the a transmitter end of the optical link. An initial phase relationship between the components is selected such that the involved signal components will be phase aligned at the selected location. In order to achieve this operation, the initial phase relationship between the components may be selected to offset dispersion induced phase changes between the transmitter end of the link and the selected location. One or more optical spikes can be generated at respective arbitrarily selected locations within the link, and may be used for performance monitoring, system control, or other purposes.

20 Claims, 8 Drawing Sheets

U.S. PATENT DOCUMENTS

| | | | |
|---|---|---|---|
| 5,349,312 | A | 9/1994 | Huettner et al. |
| 5,408,498 | A | 4/1995 | Yoshida |
| 5,416,626 | A | 5/1995 | Taylor |
| 5,446,574 | A | 8/1995 | Djupsjobacka et al. |
| 5,513,029 | A | 4/1996 | Roberts |
| 5,579,328 | A | 11/1996 | Habel et al. |
| 5,761,225 | A | 6/1998 | Fidric et al. |
| 5,892,858 | A | 4/1999 | Vaziri et al. |
| 5,949,560 | A | 9/1999 | Roberts et al. |
| 5,999,258 | A | 12/1999 | Roberts |
| 6,067,180 | A | 5/2000 | Roberts |
| 6,115,162 | A | 9/2000 | Graves et al. |
| 6,118,566 | A * | 9/2000 | Price .......................... 398/194 |
| 6,124,960 | A | 9/2000 | Garthe et al. |
| 6,128,111 | A | 10/2000 | Roberts |
| 6,205,262 | B1 | 3/2001 | Shen |
| 6,262,834 | B1 | 7/2001 | Nichols et al. |
| 6,304,369 | B1 | 10/2001 | Piehler |
| 6,441,932 | B1 | 8/2002 | Helkey |
| 6,473,013 | B1 | 10/2002 | Velazquez et al. |
| 6,559,994 | B1 | 5/2003 | Chen et al. |
| 6,574,389 | B1 * | 6/2003 | Schemmann et al. ......... 385/24 |
| 6,580,532 | B1 | 6/2003 | Yao et al. |
| 6,590,683 | B1 * | 7/2003 | Spickermann .............. 398/158 |
| 2001/0028760 | A1 | 10/2001 | Yaffe |
| 2002/0018268 | A1 | 2/2002 | Price et al. |
| 2002/0024694 | A1 | 2/2002 | Newell et al. |
| 2002/0106148 | A1 | 8/2002 | Schemmann et al. |
| 2003/0011847 | A1 | 1/2003 | Fa et al. |

FOREIGN PATENT DOCUMENTS

| | | |
|---|---|---|
| EP | 0 971 493 | 1/2000 |
| EP | 1 223 694 | 7/2002 |
| EP | 1 237 307 | 9/2002 |
| WO | WO 01/03339 | 1/2001 |
| WO | WO 01/91342 | 11/2001 |
| WO | WO 02/43340 | 5/2002 |

OTHER PUBLICATIONS

Andre, P.S. et al "Extraction of DFB Laser Rate Equations Parameters for Optical Simulation Purposes", Conftele 99 ISBN 972-98115-0-4, pp. 561-564, 1999.

Illing, Lucas et al "Shaping current waveforms for direct modulation of semiconductor lasers", Institute for Nonlinear Science, 2003, San Diego, U.S.A.

Watts, P.M. et al "Demonstration of Electrical Dispersion Compensation of Single Sideband Optical Transmission", Optical Networks Group, Dept. of Electronic and Electrical Engineering, University College London, Torrington Place, London, 2003.

Kim, Hoon et al "10 Gbit/s 177 km transmission over conventional singlemode fibre using a vestigial side-band modulation format", Electronics Letters, Dec. 6, 2001, pp. 1533-1534, vol. 37, No. 25.

Bulow, Henning et al "Dispersion Mitigation Using a Fiber-Bragg-Grating Sideband Filter and a Tunable Electronic Equalizer", WDD34, pp. 1-4, 2002.

Sieben, M. et al "10Gbit/s optical single sideband system", Electronics Letters, May 22, 1997, pp. 971-973, vol. 33, No. 11.

Schaffer, Troy A. et al "A 2GHz 12-bit Digital-to-Analog Converter for Digital Synthesis Applications", GaAs IC Symposium, pp. 61-64, 1996.

Kamoto, T. et al "An 8-bit 2-ns Monolithic DAC", IEEE Journal of Solid-State Circuits, Feb. 1988, vol. 23, No. 1.

Feidhaus, G: "Volterra Equalizer for Electrical for Electrical Compensation of Dispersion and Fiber Nonlinearities", Journal of Optical Communications, Fachverlag Schlele & Schon, Berlin, De, vol. 23, No. 3, Jun. 2002, pp. 82-84, XP001130377, ISSN: 0173-4911.

Adaptive Electronic Linearization of Fiber Optic Links, OFC 2003, vol. 2, pp. 477-480, Mar. 2003, Sadhwani et al.

Automated Measurement of Polarization Mode Dispersion Using Jones Matrix Eigenanalysis, IEE Photonics, 1992.

Technology Letters, vol. 4, No. 9, pp. 1066-1069, Sep. 1992, Heffner.

Chromatic Dispersion Mapping by Sensing the Power Distribution of Four-Wave Mixing Along the Fiber Using Brillouin Probing, OFC 2003, vol. 2, pp. 714-716, Herraez et al.

Design of Broad-Band PMD Compensation Filters, IEEE Photonics Technology Letters, vol. 14, No. 8, Aug. 2002, A. Eyal et al.

Dispersion Compensation by Active Predistorted Signal Synthesis, Journal of Lightwave Technology, vol. LT-3, No. 4, Aug. 1985, Thomas L. Koch and Rod C. Alferness.

Dispersion Compensation with an SBS-Suppressed Fiber Phase Conjugator Using Synchronized Phase Modulation, OFC 2003, vol. 2, pp. 716-717, M. Tani.

Electrical Signal Processing Techniques in Long-Haul Fiber-Optic Systems, 1990 IEEE-Transactions on Communications, vol. 38, No. 9, Jack H. Winters, et al.

Exact Compensation for both Chromatic Dispersion and Kerr Effect in a Transmission Fiber Using Optical Phase Conjuction, Journal of Lightwave Technology, vol. 14, No. 3, Mar. 1996.

High-Dynamic-Range Laser Amplitude and Phase Noise Measurement Techniques, IEEE Journal on Selected Topics in Quantum Electronics, vol. 7, No. 4, Jul./Aug. 2001, Ryan P. Sc.

Measurement of High-Order Polarization Mode Dispersion, IEEE Photonics Technology Letters, vol. 12, No. 7, Jul. 2000, Yi Li et al.

Mitigation of Dispersion-Induced Effects Using SOA in Analog Optical Transmission, IEEE Photonics Technology Letters, vol. 14, No. 8, Aug. 2002, Duk-Ho Jeon et al.

Performance of Smart Lightwave Receivers With Linear Equalization, Journal of Lightwave Technology, vol. 10, No. 8, Aug. 1992, John C. Cartledge, et al.

Polarization Effects in Lightwave Systems, Craig. D. Poole and Jonathan Nage, 1997.

Polarization Modulated Direct Detection Optical Transmission Systesm, Journal of Lightwave Technology, vol. 10, No. 12, Dec. 1992.

Predistortion of Electroabsorption Modulators for Analog CATV Systems at 1.55 m, Journal of Lightwave Technology, vol. 15, No. 9, Sep. 1997, Gordon C. Wilson et al.

Predistortion Techniques for Linearization of External Modulators, 1999 IEEE—Gordon Wilson, Lucent Technologies, NJ 07733, U.S.A.

Reduction of Dispersion-Induced Distortion in SCM Transmission Systems by Using Predistortion-Linearized MQW-EA Modulatirs, Journal of Lightwave Technology, vol. 15, No. 2, Fe, 1997.

Representation of Second-Order Polarisation Mode Dispersion, Electronics Letters, vol. 35, No. 19, Sep. 16, 1999, A. Eyal et al.

Signal Distortion and Noise in AM-SCM Transmission Systems Employing the Feedfrorward Linearized MQW-EA External Modulator, Journal of Lightwave Technology, vol. 15, No. 8, Aug. 1995, T. Iwai et al.

Soliton Transmission Using Periodic Dispersion Compensation, Journal of Lightwave Technology, vol. 15, No. 10, Oct. 1997, Nicholas J. Smith et al.

Theoretical Basis of Polarization Mode Dispersion Equalization up to the Second Order, Journal of Lightwave Technology, vol. 18, No. 4, Apr. 2000, Teruhiko Kudou et al.

H. Gysel et al. "Electrical Predistortion to Compensate for Combined Effect of Laser Chirp and Fibre Dispersion", Electronics Letters IEE Stevenage vol. 27, No. 5, Feb. 1991.

A. Mecozzi et al. "Cancellation of timing and Amplitude Jitter in Symmetric Links Using Highly Dispersed Pulses", IEEE Photonics Technology Letters, vol. 13, No. 5, May 2001.

* cited by examiner

LOCATION SPECIFIC OPTICAL MONITORING

CROSS-REFERENCE TO RELATED APPLICATIONS

This application is based on, and claims priority under 35 U.S.C. §119(e) of Applicant's co-pending U.S. patent applications Nos. 10/262,944, filed Oct. 3, 2002; Ser. No. 10/307,466 filed Dec. 2, 2002; and Ser No. 10/405,236 filed Apr. 3, 2003. This application also claims priority of International Patent Application No. PCT/CA03/01044 filed Jul. 11, 2003.

MICROFICHE APPENDIX

Not Applicable.

TECHNICAL FIELD

The present invention relates to optical communications systems, and in particular to location-specific monitoring of nonlinear impairments in an optical communications system

BACKGROUND OF THE INVENTION

In modern optical communications networks, it is generally desirable to transmit optical signals at high power levels in order to maintain sufficient signal to noise ratios over extended transmission distances, and thereby obtain an acceptably low Bit Error Rate (BER).

However, conventional optical communications links often exhibit nonlinear effects at high optical power levels, resulting in degradation of the optical signal. Nonlinear effects may occur within optical terminals of the system, in optical transmission media or in components such as optical amplifiers. The optimum power level at which optical signals can be transmitted is typically the maximum power level at which significant degradation due to nonlinearity is avoided. Since the performance of various optical components within the system varies with operating conditions, age, and component replacement, a safety margin is used in setting the maximum power level. Consequently, optical communications systems typically operate at power levels which are less than the optimum power level. A detailed discussion of nonlinear optical effects is provided by Agrawal, Govind P., "Nonlinear Fiber Optics", $2^{nd}$. Ed., Academic Press, Inc., San Diego, Calif., 1995 (ISBN 0-12-045142-5).

Of particular concern in considering nonlinear processes are the effects of phase nonlinearities, which increase as data rates and optical power levels increase, and which ultimately limit both system performance and signal reach.

Phase nonlinearities are the result of complex interactions between the optical power present in the fiber; the refractive index of the fiber medium, including the non-linear index coefficient; the wavelength division multiplexing (WDM) channel spacing; the polarization states of the signals within each of the channels; and the proximity of channel wavelengths to the zero-dispersion wavelength of the fiber. Phase nonlinearities include self-phase modulation (SPM), cross-phase modulation (XPM), and modulation-instability (MI), all of which are discussed in detail in Agrawal (supra), at chapters 4 and 7.

Self-phase modulation (SPM) is a by-product of the relationship between the refractive index of the fiber medium and the optical power present in the fiber. In particular, changing optical power causes a change in the refractive index of the fiber medium. The refractive index change is proportional to the optical power level. Changing the refractive index produces a Doppler-like frequency shift (or chirp) that is proportional to the time-rate of change of the refractive index (and, equivalently, the optical power level). Thus, changing optical power levels due to modulation of an optical signal causes a frequency-shift (or chirp) within the signal itself. For example, consider an isolated signal pulse (e.g., an isolated binary "1") launched into the optical fiber. SPM results in the leading edge of the pulse being red-shifted (that is, frequency shifted toward the red end of the optical spectrum), and the trailing edge of the pulse blue-shifted. Chromatic dispersion of the fiber will then cause these red- and blue-shifted portions of the pulse to propagate through the fiber at different speeds, which may result in time-domain distortion of the original pulse shape.

As may be appreciated, because the magnitude of the frequency shift is proportional to the time-rate of change of the optical power level, the amount of red- and blue-shift experienced by the pulse edges will be a function of the rise and fall times at the leading and trailing edges, and the peak power level of the pulse. In additional to these factors, the total time-domain distortion experienced by the pulse will also be affected by the nominal length of the pulse, and the length of the link before signal detection and regeneration. Clearly, the effects of SPM become increasingly severe as signal power, data rate (or spectral efficiency), and link length are increased.

Cross-phase modulation (XPM) is similar to SPM, and produces the same frequency-shifting effects, but occurs in Wavelength Division Multiplexed (WDM) systems. XPM is always accompanied by SPM, and occurs because the effective refractive index "seen" by an optical wave propagating in the fiber medium depends not only on the intensity of that wave but also on the intensity of other co-propagating waves. Thus, refractive index changes due to rising and falling optical power levels in one channel induce corresponding frequency-domain distortions (chirps) within co-propagating signals (in adjacent channels). Chromatic dispersion of the fiber may then induce time-domain distortions of those signals, in the same manner as described above.

Modulation instability (MI) is a Kerr-induced interaction between co-propagating optical waves (whether due to signal traffic, noise, or pump laser signals) within the optical fiber. This interaction produces new, unwanted wavelengths (or side-bands) that can interfere with, and/or couple power from, desired optical signals.

The desirability of monitoring nonlinearities in an installed optical communications systems has been recognised. Additionally, it would be highly desirable to be able to monitor nonlinearity as a function of position within an installed optical communications system. Knowledge of the location of nonlinearity enables diagnosis with respect to a particular fibre span, which can be used to identify the cause(s) of the nonlinearity. This information can then be used to optimize the overall system performance by adjusting control parameters of optical equipment at (or near) the source of the nonlinearity.

Nonlinear effects in an optical fiber can be measured using known optical signal and spectrum analysis equipment. Respective channels of a Wavelength Division Multiplexed (WDM) communications system can be monitored, either by multiple signal analyzers arranged in parallel, or using a single signal analyzer that is sequentially tuned to receive each optical channel signal in turn. Optical Spectrum Analyzers (OSAs) can be used to determine average and peak power levels, as a function of wavelength, across a desired range of wavelengths. Known analytical techniques can be used to determine non-linear effects from the data measured by these systems.

Due to their cost and complexity, conventional optical signal and spectrum analysis equipment is typically restricted to laboratory use. Furthermore, accurate measurement of nonlinear effects using such equipment typically requires specialized test set-ups, which, again, can only be provided in a laboratory setting.

In order to monitor nonlinearities in installed optical communications systems, simpler and less expensive monitoring equipment is required. Typical (in situ) optical performance monitoring systems known in the art are disclosed in co-assigned U.S. Pat. Nos. 5,513,024; 5,949,560; 5,999,258; 6,128,111; 6,222,652; and 6,252,692, While these systems enable some degree of performance monitoring, they tend to suffer a number of disadvantages. In particular, per-channel monitoring systems are typically dependent on a low frequency pilot tone (or dither) having known parameters. Any error between the design and actual parameter values of the launched pilot tone will naturally degrade the accuracy of any performance parameters calculated at the monitoring point. Additionally, this approach assumes that performance parameters calculated on the basis of the low frequency pilot tone will be valid for the high-speed data traffic. Consequently, frequency-dependent effects (most notably phase nonlinearities) cannot be detected with this arrangement. Finally, the detectors and signal processors utilized in these monitoring systems are low frequency analog devices. This precludes their use for monitoring high-frequency phenomena such as SPM, XPM and MI.

Applicant's co-assigned U.S. patent application Ser. No. 10/389,804, filed Mar. 18, 2003 teaches methods and systems for monitoring phase nonlinearities in an installed optical communications system. These techniques are designed to measure the total signal distortion between the transmitter and the detection point. When the detection point is located at the receiver, this provides a "total" phase nonlinearity of the communications link. However, it provides little information concerning where the nonlinearities are located within the link. Some information in this respect can be by using multiple detection points along the link, but only with associated increased equipment costs.

Applicant's co-assigned U.S. patent application Ser. Nos 10/145,035 filed May 15, 2002; and Ser. No. 10/629,834 filed Jul. 30, 2003 disclose methods of monitoring the performance of an installed communication link using high-speed analog-to-digital (A/D) converters and digital signal processing. Some knowledge of the location of nonlinearities within the link can be deduced from the fast sampling method. However, this deduction is prone co error, because multiple solutions may yield the same measurement result. Again, these ambiguities can be resolved by using multiple performance monitoring systems distributed along the link, but only with the attendant increased cost.

Accordingly, a method and system that enables efficient monitoring of nonlinear impairments, as a function of position within an installed optical communications system remains highly desirable.

SUMMARY OF THE INVENTION

An object of the present invention is to provide a method and system that enables efficient monitoring of impairments, as a function of position within an installed optical communications system.

Accordingly, an aspect of the present invention provides a method of generating an optical spike at an arbitrarily selected location within an arbitrary optical link. The method comprises deriving a spike signal having a plurality of components, and launching the spike signal into the a transmitter end of the optical link. An initial phase relationship between the components is selected such that the involved signal components will be phase aligned at the selected location. In order to achieve this operation, the initial phase relationship between the components may be selected to offset dispersion induced phase changes between the transmitter end of the link and the selected location.

A further aspect of the present invention provides a method of monitoring performance of an arbitrary optical link. According to the invention, first and second optical spikes are generated within the optical link. The first optical spike is fixed at a receiver end of the link, while the position of the second spike is scanned between transmitter and receiver ends of the link. Impairments within the link can be detected by monitoring a power level of the first optical spike. In preferred embodiments, the optical spikes are generated by deriving a spike signal having a plurality of components, and launching the spike signal into the a transmitter end of the optical link. An initial phase relationship between the components is selected such that signal components will be phase aligned at the respective locations of the first and second spikes.

A further aspect of the present invention provides a method of controlling an arbitrarily selected optical element of an arbitrary optical link, in which the optical element is responsive to an elevated optical peak power vs. RMS. According to the invention, an optical spike is generated within the optical link, the optical spike being positioned proximal the optical element. Generation of the optical spike comprises deriving a spike signal having a plurality of components, and launching the spike signal into the a transmitter end of the optical link. An initial phase relationship between the components is selected such that the involved signal components will be phase aligned at the selected location. In order to achieve this operation, the initial phase relationship between the components may be selected to offset dispersion induced phase changes between the transmitter end of the link and the selected location.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
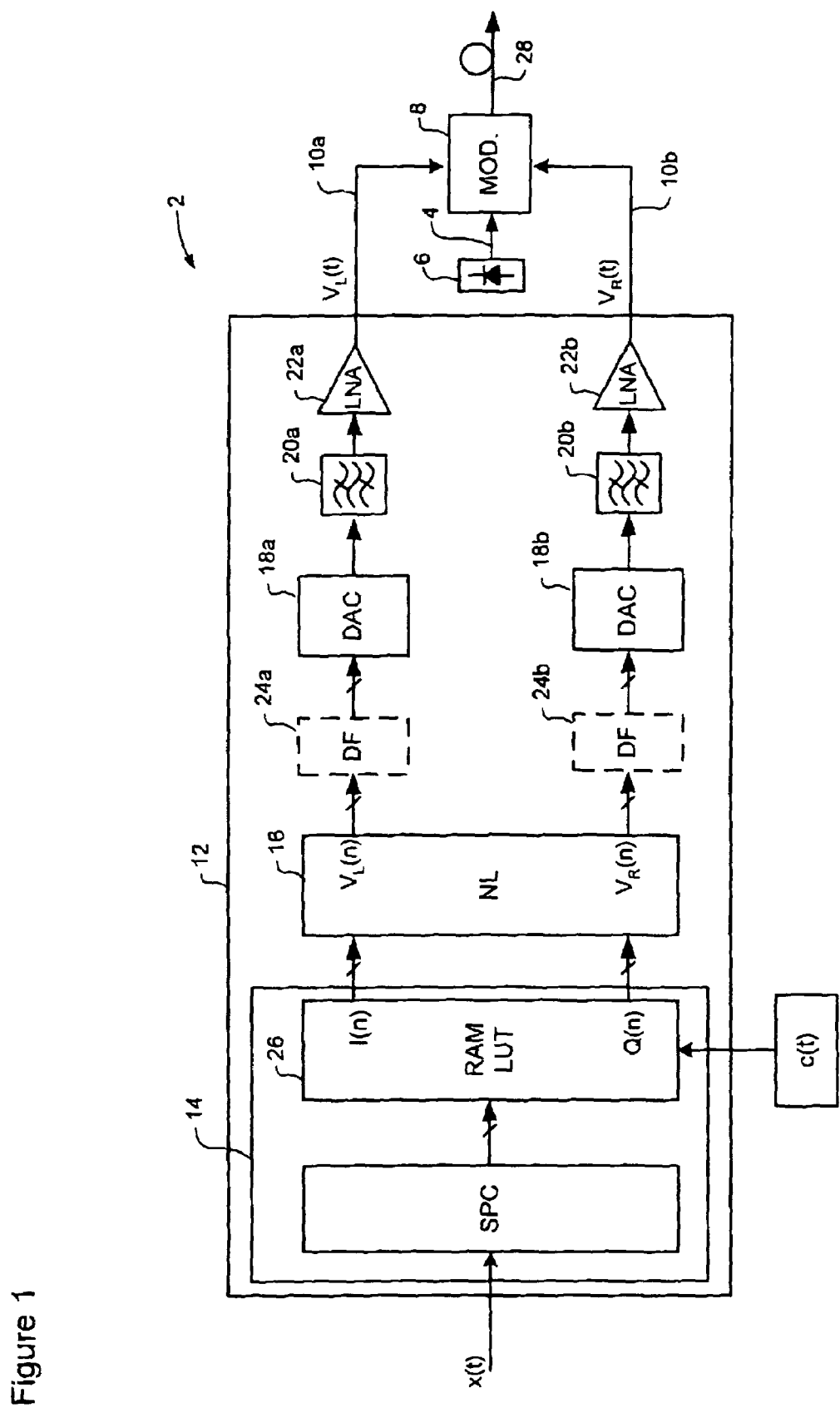
FIG. 1 is a block diagram schematically illustrating principal elements and operation of a complex optical synthesizer usable in the present invention.

The present invention provides a system and methods for generating an optical spike at an arbitrarily selected location within an arbitrary optical link. This functionality can be used to evaluate non-linear impairments, such as self-phase modulation (SPM) as a function of position within the link. For the purposes of the present invention, the term "optical spike" will be understood to refer to a significant localized increase in peak optical intensity relative to the RMS value. The ratio of peak-to-RMS optical intensity within the optical spike will vary depending on the application in question. However, the ratio will typically be on the order of 3 or more. The waveform of the "spike" can be arbitrary. For simplicity, the present invention is described by way of an example in which the (or each) spike has a single peak and a substantially Gaussian waveform. However, any other waveform (such as triangular, square, multiple peaks etc.) may equally be used. Furthermore, the spike waveform may be defined in terms of the complex valued E-field. As such, the optical spike is not limited to optical power, but rather may be complex valued entity.

In general, the method of the present invention involves deriving a spike signal composed of a plurality of signal components. Each component has a respective frequency, and a phase selected such that at least some of the components are phase aligned at a selected location within the link. This can, for example, be accomplished by selecting phase relationships, at the transmitter, which substantially offset corresponding dispersion-induced phase changes between the transmitter and the selected location. As a result, as the spike signal traverses the optical link between the transmitter and the selected location, optical dispersion of the link gradually pulls the involved signal components into phase alignment. Between the transmitter and the selected location, the components are out of phase, and the peak optical power is close to the IMS value. When the phases align, constructive interference between the signal components causes the peak optical power to reach a maximum value relative to the RMS. Downstream of the selected location, link dispersion pulls the components back out of phase, with the result that peak optical power levels drop back to close to the RMS value. Since the location of the spike is determined by dispersion along the link, and the initial phase relationship between the components forming the spike signal, it is possible to place the optical spike at virtually any desired location between the transmitter and the receiver. In fact, by controlling the number of components, the component frequencies and their respective (initial) phases, it is possible to generate a desired number of optical spikes at respective desired locations within the link. Using the transmitter of the present invention, this functionality can be obtained at little or no cost.

As will be appreciated, because nonlinearities are a function of rise and fall times (actually, the first time derivative of optical power) of the leading and trailing edges and the peak power level (all of which are maximized within an optical spike), the effects of an optical spike within the link has a detectable affect on other signals (or signal components) traversing the link. Because the size and location of the spike are known, it is possible to associate measured nonlinear effects to that location within the link. Thus, by scanning the location of the spike through the link, and monitoring signals arriving at the receiver, it is possible to systematically analyse link nonlinearity as a function of location.

For the purposes of the present description, this monitoring technique is implemented by generating two optical spikes within the link. One spike is substantially stationary, and located at the receiver end of the link, so that its peak power level can be directly measured. The other spike is "scanned" through the link. The presence of the second spike causes nonlinearity-induced signal distortions which produce readily detectable changes in the peak power level of the second spike.

Two different methods of generating a pair of spikes within the link are described below, by way of example. In a first method, the component frequencies and phases of the spike signal are selected such that link dispersion will cause two (or more) spikes with a given periodicity. In a second method, a pair of independent spike signals are derived, each of which is designed to generate exactly one optical spike within the link.

As may be appreciated, generation of spikes within the link requires arbitrary E-field modulation of a continuous wave (CW) optical signal in the complex (e.g. In-phase and Quadrature) plane. Various systems may be used for this purpose. For example, FIG. 1 shows an optical synthesizer 2 designed to perform complex E-field modulation of a Continuous Wave (CW) optical carrier 4 generated by a narrow-band laser 6. As described in detail in applicant's co-pending U.S. patent application Ser. Nos. 10/262,944, filed Oct. 3, 2002; Ser. No. 10/307,466 filed Dec. 2, 2002; and Ser. No. 10/405,236 filed Apr. 3, 2003; and International Patent Application No. PCT/CA03/01044 filed Jul. 11, 2003, the synthesizer 2 comprises a complex modulator driven by a pair of orthogonal (e.g. Cartesian coordinate or Polar coordinate) drive signals 10a, 10b generated by a complex driver circuit 12.

In the embodiment of FIG. 1, the complex driver circuit 12 comprises a digital filter 14 cascaded with a linearizer compensator 16, which cooperate to generate successive digital sample values $V_R(n)$ and $V_L(n)$. These digital sample values are then converted into corresponding analog voltage levels by respective digital-to-analog converters (DACs) 18, filtered (at 20) to reduce out-of-band noise, and scaled by low noise amplifiers 22 to yield the desired drive signals $V_R(t)$ and $V_L(t)$. If desired, respective digital filters 24 may be positioned between the linearizer 16 and the DACs 18 in order to compensate any propagation delay differences between the DACs 18 and the MZ modulator 8.

Various known digital filter types may be used to implement the digital filter 14, such as, for example, Finite Impulse Response (FIR) filters, Infinite Impulse Response (IIR) filters, and Past Fourier Transform (FFT filters). However, the digital filter 14 can also be implemented using a Random Access Memory Look-up Table (RAM LUT) 26, as shown in FIG. 1. In either case, the digital filter 14 generates successive sample values I(n) and Q(n), which represent the desired E-Field in Cartesian (In-phase and Quadrature) coordinates, at a sample rate which is about double the channel bit-rate.

Figure 2:
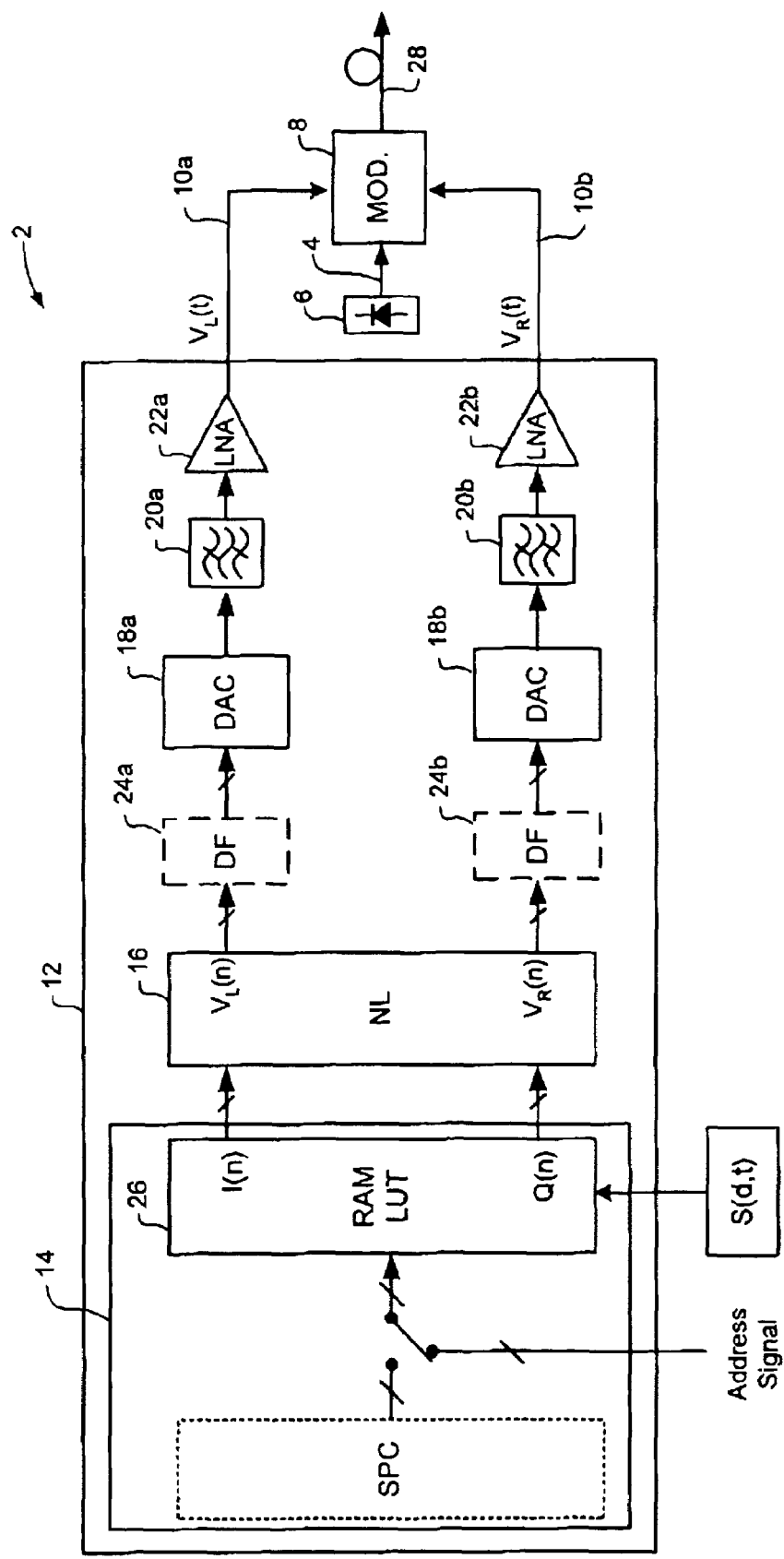
FIG. 2 is a block diagram schematically illustrating operation of the complex optical synthesizer of FIG. 1 for generating a spike signal in accordance with the present invention.

In applicant's co-pending U.S. patent application Ser. Nos. 10/262,944, filed Oct. 3, 2002; Ser. No. 10/307,466 filed Dec. 2, 2002; and Ser No. 10/405,236 filed Apr. 3, 2003; and International Patent Application No. PCT/CA03/01044 filed Jul. 11, 2003, the digital filter 14 implements predistorsion of a serial input signal x(t) in accordance with a compensation function C(t) which substantially compensates impairments of the optical communications link 28. However, the complex driver circuit 12 can also be used to generate any arbitrary complex E-field modulation, by disconnecting the serial input signal x(t), and using an address signal 10 sequentially access registers of the RAM LUT 26, as may be seen in FIG. 2. In the present invention, this capability is used to transmit the spike signal.

In particular, because the spike signal S(d,t) is composed of periodic (for simplicity, sinusoidal) components, the spike signal S(d,t) will also be periodic. It is therefore a simple matter to divide the signal period into N sample periods, and compute respective In-phase and Quadrature values I(n) and Q(n) of the spike signal S(d,t) for each sample period. Note that this computation is performed for the spike signal S(d,t) at the transmitter, so that d=0; and each of the N sample periods translates into a respective value of time (t). Preferably, the number N of sample periods is selected such that a sample rate of approximately double the maximum component frequency $\omega_{MAX}$ can be used. The thus computed sample values I(n) and Q(n) can then be stored in the RAM LUT 26 such that, by accessing each register of the RAM LUT sequentially at the selected sample rate, successive sample values I(n) and Q(n) of the spike signal S(d,t) will be output from the RAM LUT 26. These sample values I(n) and Q(n) can then be used to generate the drive signals 10a and 10b and modulate the CW carrier 4 as described above.

It should be noted that, in all cases, the formation of optical spikes is a dispersion-induced effect. Accordingly, "location" within the link is properly defined in terms of the total dispersion of the link. This can be related to physical position using knowledge of link length and dispersion profile.

Method 1: Two or More Peaks Generated Using a Common Signal

Figure 3A:
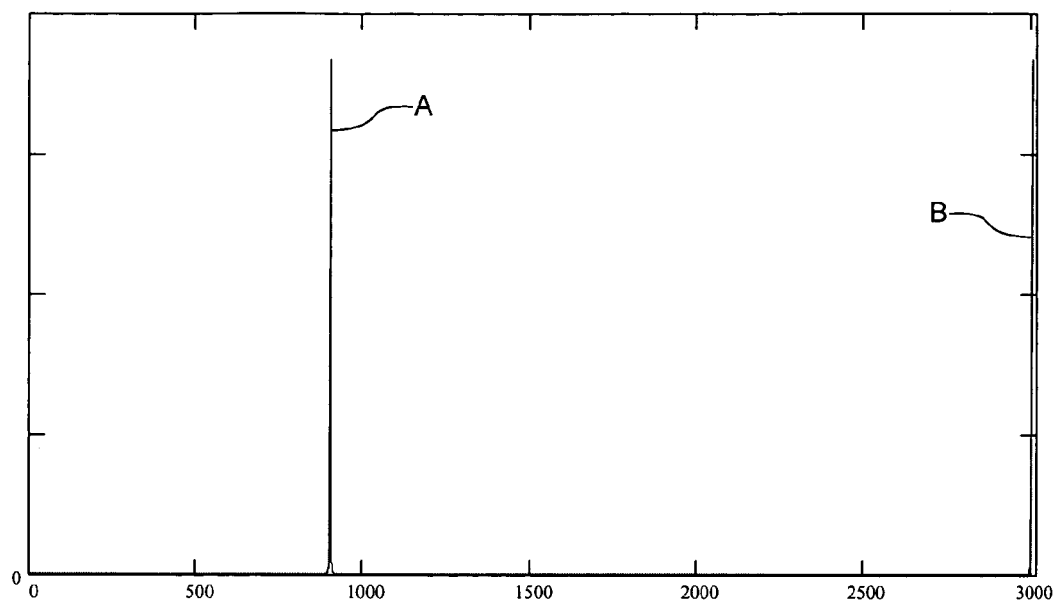
FIGS. 3a-3h are graphs illustrating the generation of optical spikes in accordance with a first embodiment of the present invention.

As mentioned above, one method of generating two (or more) optical spikes is to derive a spike signal S(d,t) in which the component frequencies and phases are selected such that link dispersion will produce multiple spikes with a given periodicity. For example, consider an optical communications link of L=3000 km in length. In order to monitor nonlinearities at a location 900 km from the transmitter, optical spikes need to be generated at 900 km and 3000 km from the transmitter, as shown in the graph of FIG. 3a in which spike A is positioned 900 km from the transmitter, and spike B is located at the receiver. This can be accomplished using a spike signal in which the component frequencies and phases are selected such that link dispersion will produce multiple spikes with a periodicity of P=3000−900=2100 km, with the first spike (A) being located 900 km from the transmitter.

Assuming that conventional (17 ps/nm) fiber is used throughout the link, the fiber dispersion D is given by:

$$D = \frac{17 \times 10^{-12}}{120 \times 10^9} \qquad \text{(Eq. 1)}$$

Where D is the link dispersion in units of seconds per Hz per km.

To maximize the peak power vs rms power, the phase of all components must be equal at each spike. Therefore, translation along the distance P must cause a phase change of k*2π (k=integer) in each component. With some algebra, this selects the following set of frequencies:

$$\omega(k, P) = \sqrt{\frac{k \cdot 2\pi}{D \cdot P}} \qquad \text{(Eq. 2)}$$

Where k is the (integer) index number of the component; P is the periodicity (that is, the distance between the spikes) in kilometers; and D is the fiber dispersion in s/Hz/Km. For example: the frequency of the third component (k=3) for P=2100 km is 1.267 GHz.

Since the optical modulation at the transmitter is complex, we do not need to have symmetry between positive and negative frequencies, and so we can use the full range of twice the bandwidth limit. Rather than using a negative nomenclature, let us set ω=0 to be the minimum frequency that can be generated and $\omega=2\omega_{MAX}=2*10.7=21.4$ GHz to be the maximum. The maximum value of k (that is, the maximum number of components) will be given by:

$$K = \text{floor}\left[\frac{(2 \cdot \omega_{MAX} \cdot 2\pi)^2 \cdot D \cdot P}{2\pi}\right] \qquad \text{(Eq. 3)}$$

For this P=2100 km example, K=856. Thus the spike signal can be defined using 856 (or fewer) frequency components.

Figure 3B:
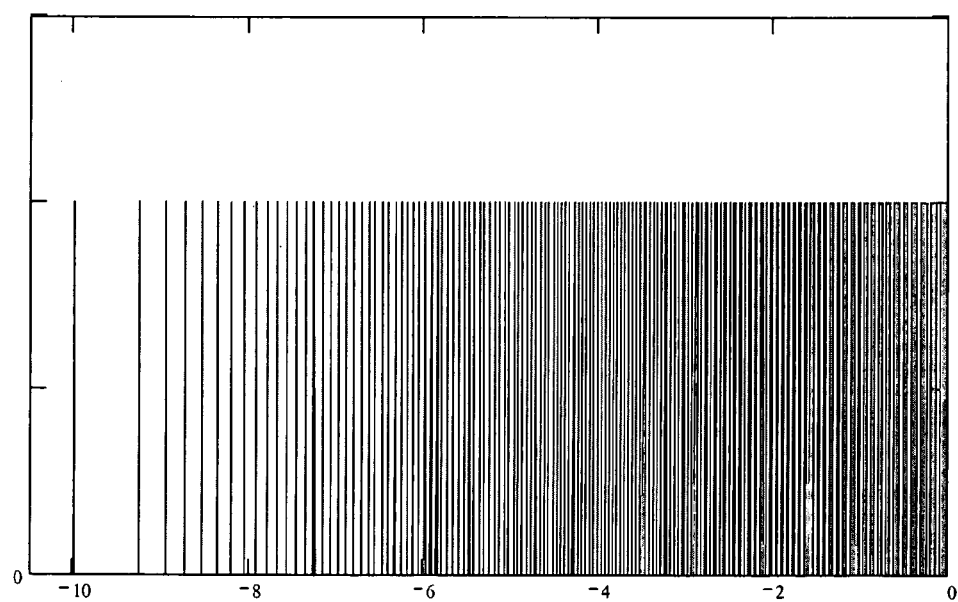
Figure 3C:
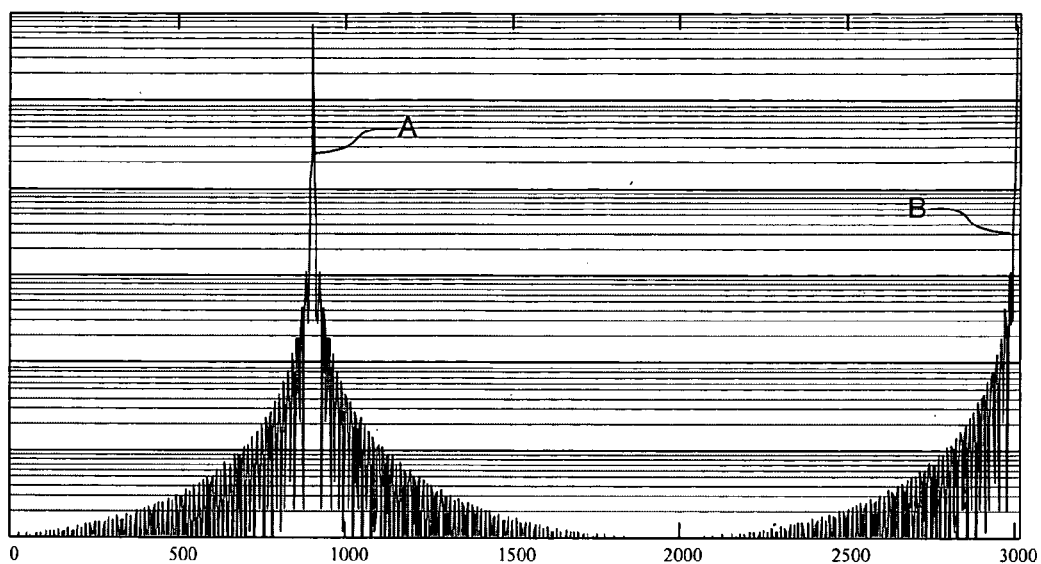

In order to place the first spike at l=900 km from the transmitter, each component must be phase shifted (at the transmitter) such that dispersion within the first 900 km of fiber will bring all of the components into phase alignment. It is convenient to define the phase of each component relative the base frequency (ω=0). In this case, the spike signal can conveniently be defined as a function of distance and time, with the location of zero phase moving at the speed of propagation of the base frequency (ω=0). This yields a spike signal of the form:

$$S(d, t) = \sum_{k=0}^{K} e^{jD(d-1)\cdot(\omega_1)^2 + j\omega_k 1} \qquad \text{(Eq. 4)}$$

in which d is the distance from the transmitter (d=0 denotes the position of the transmitter), and the periodicity P=2100 governs the choice of the set of frequencies $\omega_k$. FIG. 3b is a graph showing a partial spectrum of the spike-signal S(d,t) composed of 856 signal components having frequencies $\omega_k$ as defined above in Equation 2, in which each of the 856 components is assigned an equal power level at the transmitter. For clarity of illustration, only one half of the spectrum (between −10 GHz and 0) is shown. The remaining half of the spectrum (between 0 and +10 GHz) continues the square-root pattern defined by Equation 2. FIG. 3c is a graph showing the optical spikes centered at 900 and 3000 km, as in FIG. 3a, but in this case the optical power (vertical axis) is plotted on a log scale.

Figure 3D:
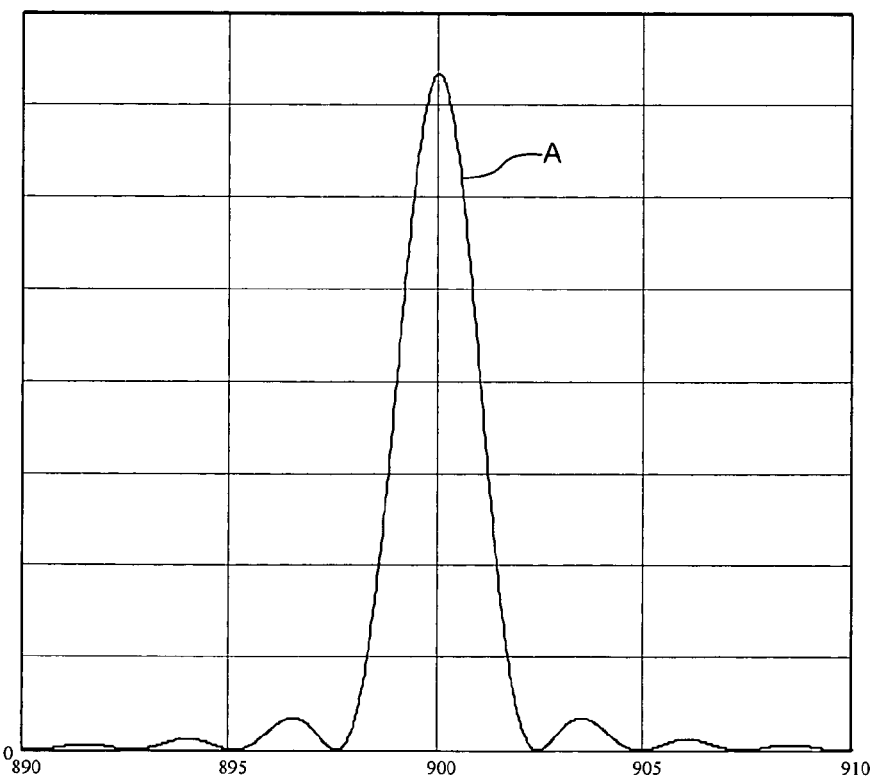
Figure 3E:
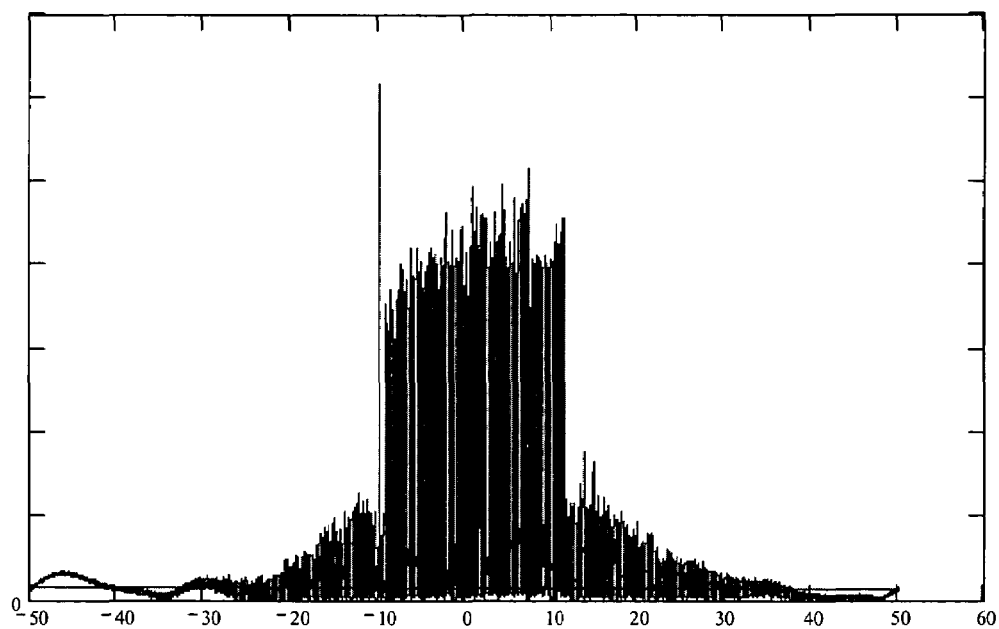
Figure 3F:
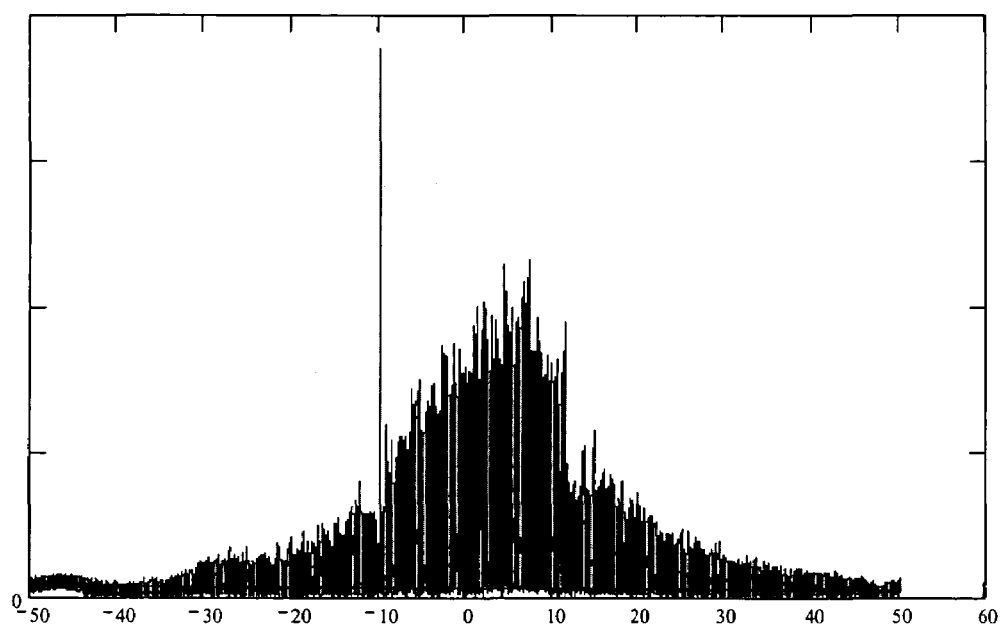
Figure 3G:
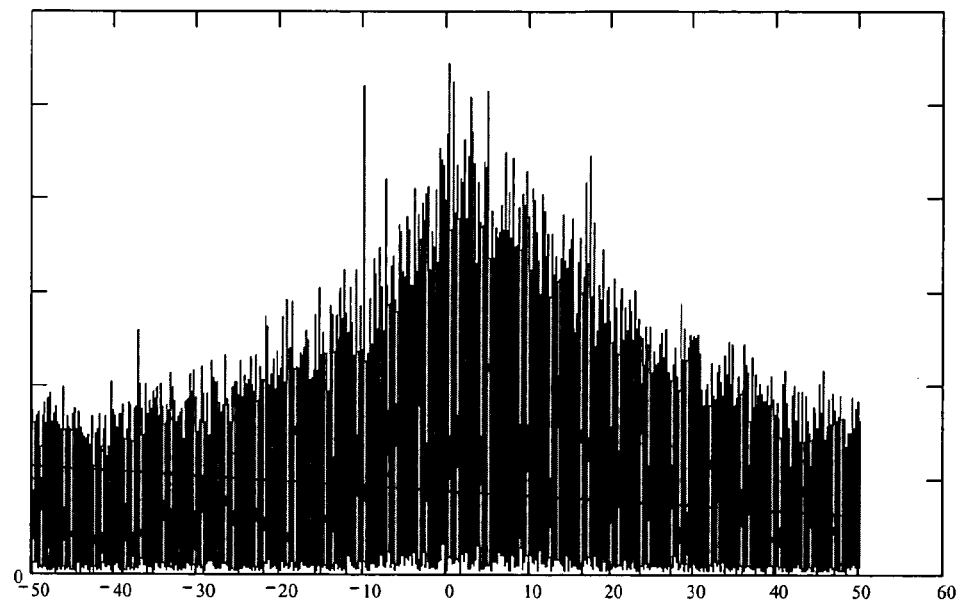
Figure 3H:
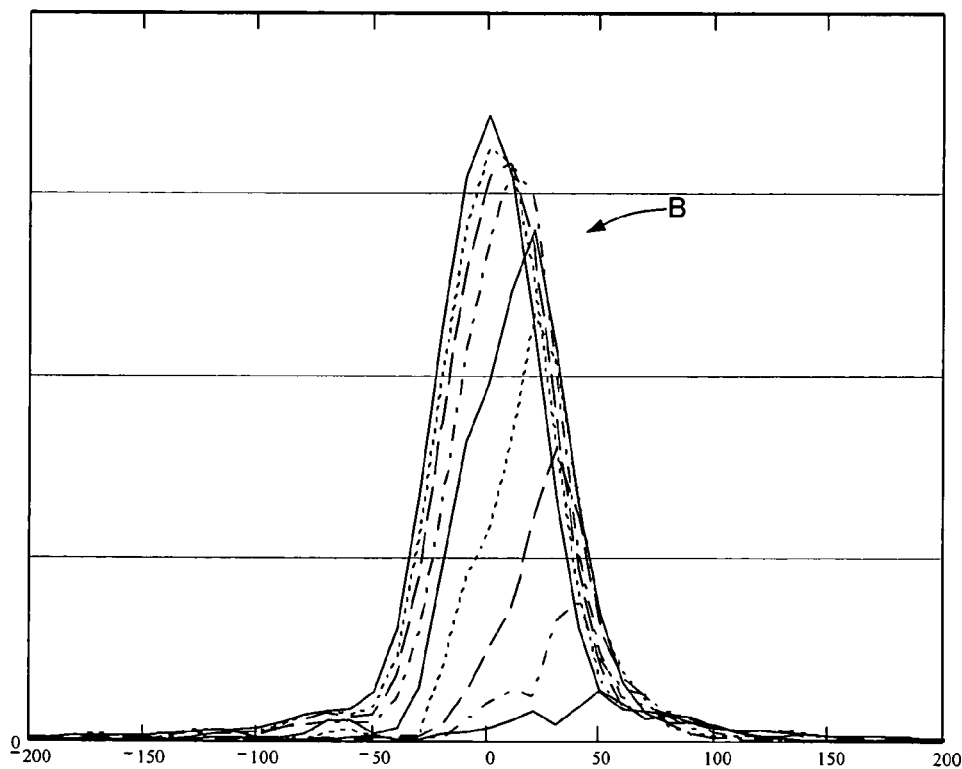

FIG. 3d is a "close-up" view of optical spike A, which is centered at 900 km. As may be seen in FIG. 3d, the optical spike has an effective width of approximately 3 km of fiber, within a 3000 km link. The ratio of peak power vs. RMS power is very high (possibly on the order of several hundred, depending on the spectral characteristics of the link). The resulting high rise and fall times induces severe nonlinear distortions in the spike signal. FIGS. 3e-g show spike signal spectra of the spike A, for low, medium and high transmission power levels, respectively. As expected, increasing the transmission power magnifies nonlinear distortions, with associated spectral changes in the spike signal as it traverses the link.

Because of the dramatically increased peak power level (and rise and fall times) vs. RMS at spike A, nonlinearity-induced signal distortions detected at the receiver (via changes in spike B) will be dominated by link nonlinearity at the 900 km point. For example, FIG. 3$h$ is a graph showing changes in the shape of spike B with changing average power level in spike A, with the average power level at spike B held constant. Increasing power at spike A increases the effects of link nonlinearity at that point, which progressively increases distortion of spike B. Put another way, for a given transmission power level, increased link nonlinearity (at spike A) is detectable by a reduced power level of successive spikes. Thus it will be seen that nonlinearity of the link can be monitored, as a function of location, by holding spike B stationary at the receiver, and scanning spike A through the link. Scanning of spike A can be readily accomplished by selecting a new location, and then computing the required new spike signal $S(d,t)$ using equations 1-4 above.

Method 2: Spikes Generated Using Respective Independent Signals

The above method has an advantage that two or more optical spikes can be generated, by calculating components of a single spike signal $S(d,t)$. However, this approach suffers a limitation that it will, in fact, produce multiple optical spikes at the selected periodicity P. The actual number of spikes within the link is determined by the location (l) of the first spike; the periodicity P; and the link length L. As will be appreciated, the presence of multiple optical spikes within the link can be expected to complicate localisation of nonlinearity within the link, as there may be multiple "sources" of nonlinearity-induced distortions within the spike located at the receiver. Furthermore, scanning of one spike through the link, while holding the other spike stationary at the receiver inherently requires complete recalculation of the spike signal $S(d,t)$, following equations 1-4 above.

These limitations can be overcome by deriving a respective spike signal $S_1(d,t)$ for each spike. Each spike signal $S_1(d,t)$ is thus derived to generate exactly one respective optical spike within the link. The spike signals $S_1(d,t)$ are then added together to produce a composite spike signal $S_c(d,t)$ which is then launched into the link. For example, consider a scenario in which it is desired to place two spikes A and B within the L=3000 km long link, 100 km apart, with spike B located at the receiver. Thus, two spikes must be generated, at l=2900 km and l=L=3000 km, respectively. As in the above example, the span of frequencies is $2*\omega_{MAX}$=21.4 GHz, and the link dispersion D is given by Equation 1 above.

In this case, for each spike signal $S_1(d,t)$ only one spike is to be generated within the link. Therefore, the periodicity $P_i$ of each spike signal $S_1(d,t)$ must be selected to ensure that:

$$P_i \geq (L-l_i), L \geq 2l_i$$

$$P_i \geq l_i, L < 2l_i$$

where $l_i$ is the location of the spike generated by the $i^{th}$ spike signal $S_1(d,t)$. For cases in which $L<2l_i$ (i.e. the spike is located closer to the receiver than the transmitter, it is convenient to simply set the periodicity $P_1$ of each spike signal $S_1(d,t)$ equal to the spike location $l_1$. In the present example, this yields the respective periodicity of each spike signal as:

$$P_1 = l_1 = 2900 \text{ Km and}$$

$$P_2 = l_2 = 3000 \text{ Km}$$

Using these periodicity values, equation 3 above yields values of $K_1$=1182 and $K_2$=1222, respectively, for the maximum number of components in each of the two spike signals. For simplicity, we can select a value of $K_1 = K_2 = K = 1000$ for both spike signals. Equation 2 above can then be used to calculate the set of component frequencies for each of the spike signals. Thus:

$$\omega_i(k, P_i) = \sqrt{\frac{k \cdot 2\pi}{D \cdot P_i}}, k = 1 \ldots K \quad \text{(Eq. 5)}$$

Alternatively, we can simply divide the system bandwidth ($2*\omega_{MAX}$=21.4 GHz) into 2K+1 component frequencies, assigning even frequencies to the first spike signal and odd frequencies for the second spike signal. This will ensure a substantially equal division of optical power between the two spikes. Thus:

$$\omega1(k) = 2k \frac{\omega_{MAX}}{K+1} \cdot 2\pi, k = 1 \ldots K \text{ and} \quad \text{(Eq. 6.1)}$$

$$\omega2(k) = (2k+1) \frac{\omega_{MAX}}{K+1} \cdot 2\pi, k = 1 \ldots K \quad \text{(Eq. 6.2)}$$

With these sets of component frequencies, the respective spike signals $S_1(d,t)$ can then be calculated following equation 4 above. Thus:

$$S_1(d, t) = \sum_{k=1}^{K} e^{jD(d-l_1)(\omega 1_k)^2 + j \cdot \omega 1_k \cdot t} \text{ and} \quad \text{(Eq. 7.1)}$$

$$S_2(d, t) = \sum_{k=1}^{K} e^{jD(d-l_2)(\omega 2_k)^2 + j \cdot \omega 2_k \cdot t} \quad \text{(Eq. 7.2)}$$

Figure 4A:
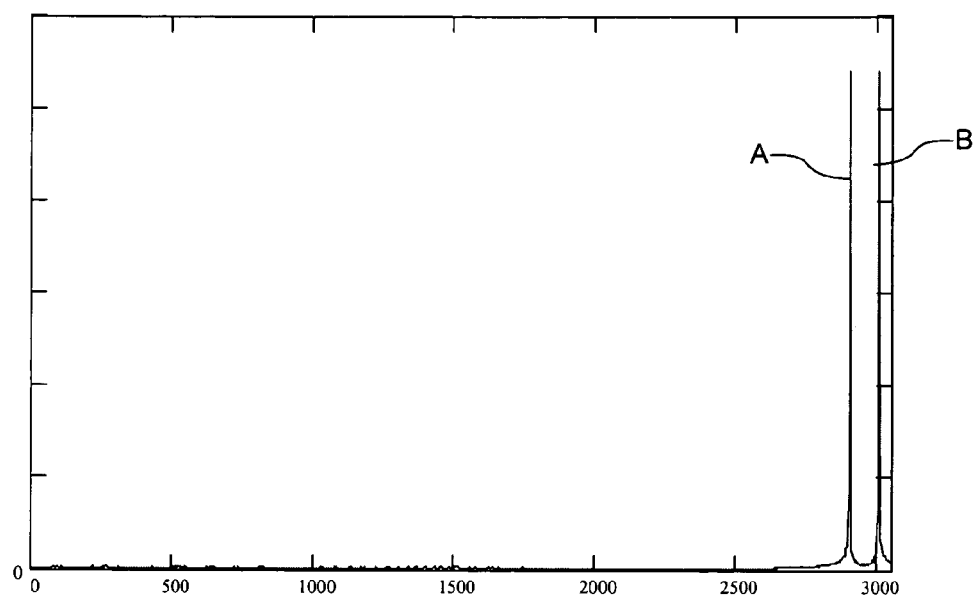
FIGS. 4a-4c are graphs illustrating the generation of optical spikes in accordance with a second embodiment of the present invention.
Figure 4B:
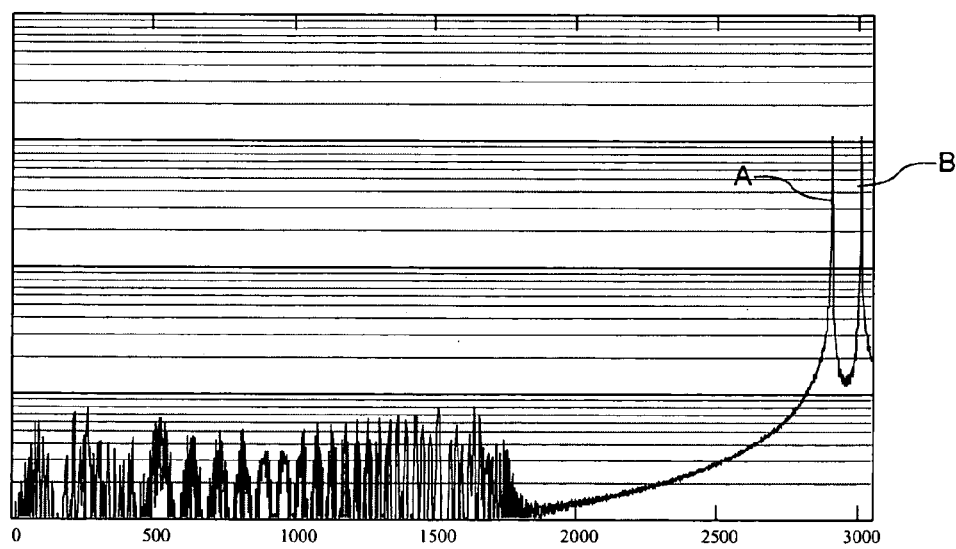
Figure 4C:
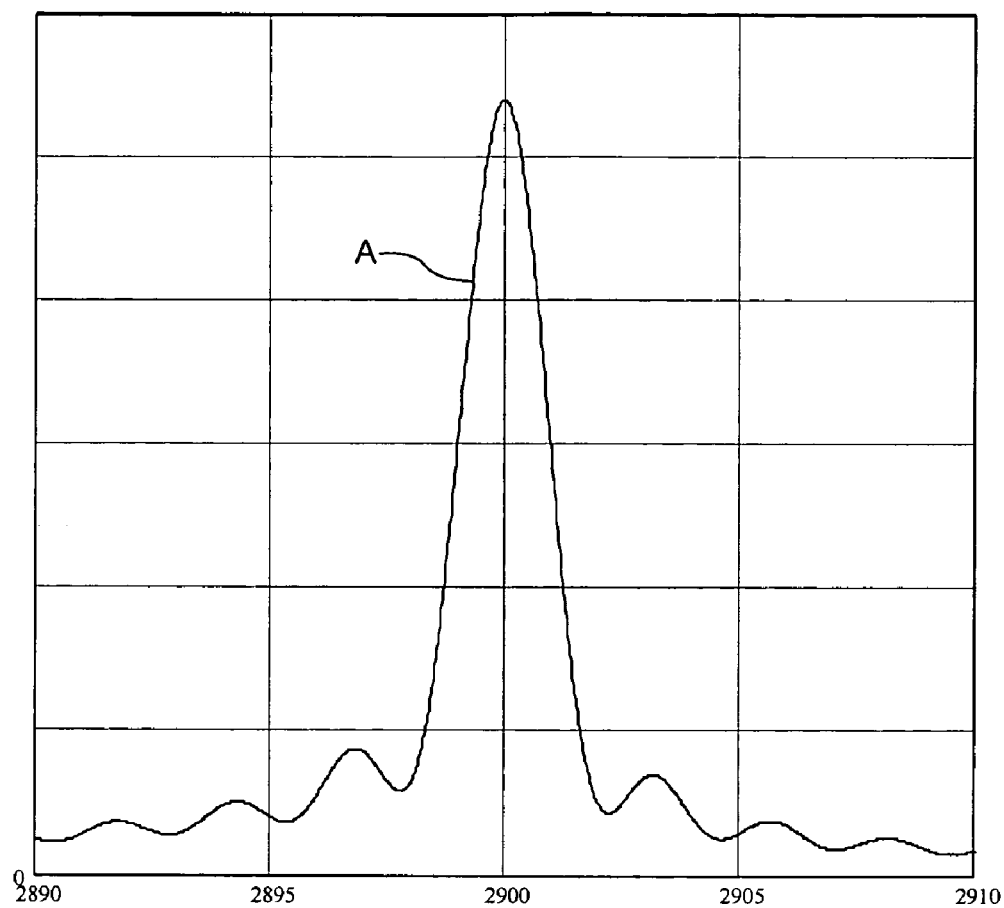

These spike signals can then be added together to form a composite spike signal $$S_C(d, t) = \sum_{i=1}^{t} S_i(d, t)$$

which can then be launched into the link as described above. FIG. 4$a$ is a graph showing the optical spikes centered at 2900 and 3000 km from the transmitter. 4$b$ is a graph showing the optical spikes centered at 2900 and 3000 km, as in FIG. 4$a$, but in this case the optical power (vertical axis) is plotted on a log scale. FIG. 4$c$ is a "close-up" view of optical spike A, which is centered at 2900 km. Here again, the optical spike has an effective width of approximately 3 km of fiber, within a 3000 km link. The ratio of peak power vs. RMS power is very high (possibly on the order of several hundred, depending on the spectral characteristics of the link). As in the example of FIGS. 3$a$-3$h$, SPM at the location of spike A acts upon the entire spike signal $S_c(d,t)$, not just upon the components that are phase aligned at that point. This is equivalent to XPM between two intermingled signals ($S_1(d,t)$ and $S_2(d,t)$). A particular advantage of this technique is that it enables the use of a much richer set of frequencies, because the periodicity constraint is removed. Among other things, this enables higher extinctions to be achieved.

In the foregoing description, the invention has been described by way of an example in which a pair of optical spikes are used to monitor nonlinearities (e.g. SPM, XPM, MI etc.) as a function of position within an installed optical link. As may be appreciated, the present invention may be used in other ways. In particular, the present invention may be used to monitor any phenomenon that is sensitive to the presence of the optical spike, such as, for example, dispersion, Raman scattering, stimulated Brilloin scattering, depletion, distortion of cross-talk, etc.

As mentioned previously, the actual location of the spike within the optical link is a function of the dispersion profile along the link. Thus accurate knowledge of the spike location requires knowledge of the dispersion profile. Various methods are known for estimating the dispersion profile, and these may be used if it is unknown in advance. In addition to these techniques, the present invention may be used to provide this information. In particular, as an optical spike is "scanned" through an optical amplifier between fibre spans, the resulting disturbance in the amplifier performance is readily detectable in the residual spike signal arriving at the receiver. Thus it is possible to determine the span in which the spike is located by scanning the spike through the link, while detecting signal disturbances as the spike passes through each successive amplifier. When used in conjunction with the (known) phase offsets applied to the spike signal components, this same technique can also be used to estimate the spike location within each span.

Another application of the present invention is in the control of optical equipment within a multi-span link. In particular, the present invention creates the possibility of placing an optical spike at a desired location (and nowhere else) within the link. This capability creates the possibility of placing an optical spike within a desired optical element of the link. If such optical element is adapted to detect (or otherwise respond to the presence of the spike in a detectable manner) then the optical spike can be used to effect a control operation. Thus it is possible to toggle an optical amplifier on or off, by temporarily positioning an optical spike at the amplifier. Alternatively, an optical switch may be controlled to change the routing of optical traffic, again by temporarily positioning an optical spike at the switch.

As may be appreciated, the power level of an optical spike is not constant, but rather is periodic, with a frequency that is dependent on the frequencies of the spike signal components. Thus it is possible to control both the position and the frequency of the optical spike. This creates the possibility of more sophisticated control functions, by designing optical elements to be responsive to both the presence of an optical spike, and its frequency.

In the foregoing embodiments, performance of the optical link is monitored by generating a pair of optical spikes within the link. A first optical spike is scanned through the link, while the power level of a second, stationary optical spike is monitored. As mentioned previously, the high power level (and sharp rising and falling edges) of the first spike causes nonlinearity-induced signal distortions, which are detectable in the second spike. In the case of a composite spike signal $S_c(d,t)$ composed of a two spike signals $S_1(d,t)$ and $S_2(d,t)$, this is equivalent to XPM between intermingled optical signals. In effect, the second spike signal $S_2(d,t)$ serves as a probe (or test) signal, which is distorted by XPM from the first spike signal $S_1(d,t)$.

Recognition of this fact opens the possibility of performing sophisticated performance monitoring using a single "scanning" optical spike in conjunction with test signals other than optical spike signals. For example, Applicant's co-assigned U.S. patent application Ser. No. 10/389,804, filed Mar. 18, 2003 teaches methods and systems for monitoring phase nonlinearities in an installed optical communications system. In that application, a pair of signals are generated and transmitted through the link. Nonlinearities within the link induce characteristic distortions in the residual signals arriving at the receiver. These distortions can be examined and analysed by digital signal processing methods to determine overall nonlinear performance of the link. By generating a "scanning" optical spike within the link in accordance with the present invention, the techniques described in co-assigned U.S. patent application Ser. No. 10/389,804 can be directly applied to analyse nonlinear performance as a function of position.

Thus it will be appreciated that the embodimentts) of the invention described above is(are) intended to be exemplary only. The scope of the invention is therefore intended to be limited solely by the scope of the appended claims.

We claim:

1. A method of generating an optical spike at an arbitrarily selected location within an optical link, the optical spike being defined by a localized increase in peak optical intensity relative to the Root Mean Square (RMS) optical intensity, the method comprising:

deriving a spike signal having a plurality of components, each component having a respective frequency and phase, an initial phase relationship between the components being selected such that dispersion of the optical link will cause the components to be phase aligned at the selected location to thereby generate the optical spike; and launching the spike signal into a transmitter end of the optical link.

2. A method as claimed in claim 1, wherein the initial phase relationship between the components is selected to offset dispersion induced phase changes between the transmitter end of the link and the selected location.

3. A method as claimed in claim 1, wherein the spike signal is derived to form an optical spike at two or more selected locations within the optical link.

4. A method as claimed in claim 3, wherein the two or more selected locations within the optical link comprises a receiver end of the link and at least one other location within the link.

5. A method as claimed in claim 3, wherein the step of launching the spike signal comprises steps of:

combining two or more spike signals into a composite spike signal; and launching the composite spike signal into the transmitter end of optical link.

6. A method as claimed in claim 1, wherein the spike signal is derived to form an optical spike at exactly one selected location within the optical link.

7. A method as claimed in claim 1, wherein the optical intensity is an optical power.

8. A method of monitoring performance of an optical link, the method comprising steps of:

generating an optical spike within the optical link, the optical spike being defined by a localized, increase in peak optical intensity relative to the Root Mean Square (RMS) optical intensity;

scanning a position of the optical spike between transmitter and receiver ends of the link; and while scanning the position of the optical spike, monitoring an optical power level at the receiver end of the link.

9. A method as claimed in claim 8, wherein the step of generating an optical spike within the optical link comprises steps of:

deriving a spike signal having a plurality of components, each component having a respective frequency and phase, an initial phase relationship between the components being selected such that dispersion of the optical link will cause the components to be phase aligned at a desired position of the optical spike; and launching the spike signal into the transmitter end of the optical link.

10. A method as claimed in claim 9, wherein the initial phase relationship between the components is selected to offset dispersion induced phase changes between the transmitter end of the link and the desired position of the optical spike.

11. A method as claimed in claim 10, wherein the step of scanning a position of the optical spike comprises a step of adjusting the initial phase relationship between the components.

12. A method as claimed in claim 9, wherein the step of monitoring an optical power level at the receiver end of the link comprises a step of monitoring a residual power level of the spike signal at the receiver end of the link.

13. A method as claimed in claim 12, wherein the step of monitoring a residual power level of the spike signal at the receiver end of the link comprises a steps of:

selecting component frequencies such that the spike signal generates a second optical spike within the optical link, the second optical spike being substantially fixed at the receiver end of the link; and monitoring a power level of the second optical spike.

14. A method as claimed in claim 9, wherein the step of monitoring an optical power level at the receiver end of the link comprises steps of:

launching a predetermined test signal into the transmitter end of the link; and monitoring the test signal at the receiver end of the link.

15. A method as claimed in claim 14, wherein the test signal comprises a second spike signal for generating a respective second optical spike within the optical link, the second optical spike being located proximal the receiver end of the link.

16. A method as claimed in claim 15, wherein the step of monitoring the test signal comprises a step of monitoring a power level of the second optical spike.

17. A method of controlling an arbitrarily selected one of a plurality of optical elements of an optical link, each of the plurality of optical elements being responsive to an elevated optical peak power vs. Root Mean Square (RMS) optical power, the method comprising steps of:

generating an optical spike within the optical link, the optical spike being defined by a localized increase in peak optical intensity relative to the RMS optical intensity and being positioned proximal the selected optical element.

18. A method as claimed in claim 17, wherein the step of generating the optical spike within the optical link comprises steps of:

deriving a spike signal having a plurality of components, each component having a respective frequency and phase, an initial phase relationship between the components being selected such that dispersion of the optical link will cause the components to be phase aligned proximal the selected optical element, and not phase aligned elsewhere; and launching the spike signal into a transmitter end of the optical link.

19. A method as claimed in claim 18, wherein the initial phase relationship between the components is selected to offset dispersion induced phase changes between the transmitter end of the link and the selected optical element.

20. A method as claimed in claim 18, wherein respective component frequencies are selected to define a periodicity of the spike signal sized to ensure that exactly one spike is generated within the link.

* * * * *